(12) United States Patent
Pfuhl et al.

(10) Patent No.: US 11,968,987 B2
(45) Date of Patent: Apr. 30, 2024

(54) CUTTING APPARATUS AND METHOD FOR THE FINAL SEPARATION OF FISH FILLETS FROM FISH WHICH ARE TRANSPORTED, TAIL FIRST, IN TRANSPORT DIRECTION T ALONG A TRANSPORT PATH

(71) Applicant: Nordischer Maschinenbau Rud. Baader GmbH + Co. KG, Lübeck (DE)

(72) Inventors: Arne Pfuhl, Lübeck (DE); Reiko Hüser, Lübeck (DE); Kevin Nordhaus-Keding, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 176 days.

(21) Appl. No.: 17/781,830

(22) PCT Filed: Dec. 1, 2020

(86) PCT No.: PCT/EP2020/084113
§ 371 (c)(1),
(2) Date: Jun. 2, 2022

(87) PCT Pub. No.: WO2021/110672
PCT Pub. Date: Jun. 10, 2021

(65) Prior Publication Data
US 2023/0000094 A1 Jan. 5, 2023

(30) Foreign Application Priority Data
Dec. 5, 2019 (DE) .......................... 102019133178.1

(51) Int. Cl.
*A22C 25/00* (2006.01)
*A22C 25/16* (2006.01)

(52) U.S. Cl.
CPC .................................. *A22C 25/16* (2013.01)

(58) Field of Classification Search
CPC ..................................................... A22C 25/16
(Continued)

(56) References Cited

U.S. PATENT DOCUMENTS 5,413,524 A 5/1995 Yoshida
5,413,525 A 5/1995 Braeger et al.
(Continued)

FOREIGN PATENT DOCUMENTS

DE 1679061 A1 3/1971
DE 1679061 B2 9/1976
(Continued)

OTHER PUBLICATIONS

International Search Report dated Feb. 12, 2021; International Application No. PCT/EP2020/084113.

*Primary Examiner* — Richard T Price, Jr.
(74) *Attorney, Agent, or Firm* — DINSMORE & SHOHL LLP (57) ABSTRACT

A cutting apparatus and method are provided for final separation of fish fillets from fish transported, tail-first, in a transport direction along a transport path, and which have belly and flank cuts. The apparatus includes a frame structure, a transport apparatus driven by a drive element, having at least one receiving element for a fish, and a cutting blade assembly with two knife heads each with a driven circular blade. The knife heads are on opposing sides of the transport path such that fish transport between the blades. To alter the blade distance, the knife heads are movably mounted on the frame structure. The blade assembly is assigned at least one sensing element. Each sensing element is on the knife head downstream of the blade cutting edges, which are directed counter to the transport direction, and protrudes beyond the (Continued)

respective edge, viewed in a direction transverse towards the central.

15 Claims, 5 Drawing Sheets

(58) Field of Classification Search
USPC .......................................................... 452/135
See application file for complete search history.

(56) References Cited

U.S. PATENT DOCUMENTS

| | | | |
|---|---|---|---|
| 5,871,395 A * | 2/1999 | Grabau | A22C 25/166 |
| | | | 452/161 |
| 6,280,313 B1 * | 8/2001 | Braeger | A22C 25/16 |
| | | | 452/161 |
| 6,322,437 B1 | 11/2001 | Grabau et al. | |
| 9,125,424 B2 * | 9/2015 | Jurs | A22C 25/16 |
| 2013/0040544 A1 | 2/2013 | Ryan | |
| 2023/0389561 A1 * | 12/2023 | Pagels | A22C 25/08 |

FOREIGN PATENT DOCUMENTS

| | | |
|---|---|---|
| DE | 19881497 C1 | 4/2003 |
| GB | 491027 A | 8/1938 |
| GB | 1196136 A | 6/1970 |
| RU | 2075158 C1 | 3/1997 |

\* cited by examiner

CUTTING APPARATUS AND METHOD FOR THE FINAL SEPARATION OF FISH FILLETS FROM FISH WHICH ARE TRANSPORTED, TAIL FIRST, IN TRANSPORT DIRECTION T ALONG A TRANSPORT PATH

CROSS-REFERENCE TO RELATED APPLICATIONS

This application is the U.S. National Stage of PCT/EP2020/084113 filed on Dec. 1, 2020, which claims priority to German Patent Application 102019133178.1 filed on Dec. 5, 2019, the entire content of both are incorporated herein by reference in their entirety.

FIELD OF THE INVENTION

The invention relates to a cutting apparatus, configured and adapted for the final separation of fish fillets from fish which are transported, tail-first, in transport direction T along a transport path and which have already undergone a belly cut and a flank cut, comprising a frame structure, a transport apparatus, which is rotatively driven by means of a drive element, having at least one receiving element for a fish to be processed, and a cutting blade assembly which has two knife heads, each with a driven circular blade, the two knife heads being located on opposite sides of the transport path in such a manner that the fish which are to be processed can be transported through along the transport path between the circular blades located at a distance from each other.

Furthermore, the invention relates to a method for the final separation of fish fillets from fish which are transported, tail-first, in transport direction T along a transport path and which have already undergone a belly cut and a flank cut, comprising the steps: Transporting the fish to be processed, tail-first, in transport direction T along a transport path by means of a transport apparatus, cutting the fish fillets parallel to the backbone of the fish to be processed by means of a cutting blade assembly, in that the fish to be processed are transported through, tail-first and with their backs directed upwards towards the cutting blade assembly, between two circular blades of the cutting blade assembly which are located at a distance from each other.

BACKGROUND OF THE INVENTION

Such cutting apparatuses and methods are used in the fish processing industry to finally and completely loosening fish fillets pre-loosened from the bone structure by a belly cut and a flank cut. For this purpose, the fish to be processed are transported tail-first and ventral side, i.e. dorsal spokes, downwards in transport direction T along a transport path in a transport plane, thereby passing through the different processing stations. The transport plane is not to be understood as a plane in the strictly mathematical sense. Rather, the transport plane describes the plane region in which the fish are transported by means of the transport apparatus. The upper side/upper surface of the transport apparatus defines a plane E. This plane and planes parallel to it form the plane region. The belly cut is made by means of a circular blade pair with a cut to both sides of the backbone of the fish, starting in the region of the tail towards the belly cavity of the fish, the dorsal spokes being guided between the circular blades. With regard to the cutting depth, the cut is made vertical to the transport direction T and vertical to the transport plane E to just below the backbone. This releases the fish fillets from the dorsal spokes on both sides of the backbone. Due to the fish being continuously transported in transport direction T, the circular blades make a virtually idle cut with the circular blades in the region of the belly cavity. The flank cut is also made, for example, with a circular blade pair. In this case, the circular blades are guided along the flank bones from above such that the fish fillets are released from the flank bones, namely up to just below the backbone. Despite these preliminary cuts, the fish fillets are still connected to each other and to the bone structure, and in particular to the backbone, in the region of the back.

It is possible to perform a dorsal cut and a separating cut separately from each other. However, a combined dorsal and separating cut is preferred, for example using a cutting apparatus of the generic type. For this purpose, two circular blades of a cutting blade assembly are set in two planes to each other. In the first plane, the two circular blades are pivoted from a starting position in which they are spaced apart and parallel to each other about pivot axes extending in transport direction T in such a manner that the two circular blades are in a V-shape. In other words, the two circular blades are tilted laterally/transverse to the transport direction T. In this intermediate position, the point P of the smallest distance between the circular blades is located at the lowest blade point.

However, to create an "aggressive" circular blade position, in which the circular blades cut along as close as possible to the backbone, the two circular blades are pivoted in the second plane about a pivot axis which is oriented vertical to the transport plane E in such a manner that the point P of the smallest distance between the circular blades is remote from the lowest blade point of the circular blades. This is referred to as an "aggressive" blade position, as this enables the circular blades to be adjusted very close to the spine/backbone to achieve the highest yield possible. Ideally, the point P of the smallest distance opposes the transport direction T in such a manner that the fish to be processed dips with its tail end between the circular blades and cutting of the fish to be processed takes place with the smallest possible distance between the circular blades in order to already cut along as closely as possible to the backbone, starting from the tail. In known cutting apparatuses of the type referred to hereinbefore, the two circular blades standing in a V-shape to each other are fixed with regard to the V-position and with regard to the size of the smallest distance between the two circular blades. Basically, the angle $\alpha$ of the V-position and the distance P can be set before the cutting apparatus is put into operation. However, processing of the fish then takes place with the pre-set values. Since the fish to be processed vary in their size and the backbone of a fish also varies in its width and outline as it progresses from the tail towards the head, but setting the circular blades too close carries the inherent risk of cutting into the backbone with the circular blades, the circular blades must be set to the largest fish or the widest point of the backbone with regard to the angle $\alpha$ and in particular with regard to the distance P. This results, however, in a relevant loss of yield, since with the circular blades set for large or medium-sized fish or wide backbones, the circular blades do not come as close as required to the backbone in smaller fish and in a narrower region of the backbone. This leaves valuable meat in the region of the backbone and/or the dorsal bones which is not reached by the circular blades since the distance between the circular blades is too large. Possible abnormalities of the backbones, e.g. protrusions, excrescences, deformations or the like, cannot be compensated at all, with the result that the circular blades, which are fixed with regard to their distance, cut into the backbone.

The problem of cutting in is exacerbated by a spring-loaded pre-tensioning of the fixed circular blades, since the circular blades are then virtually "pulled" into the backbone by the "aggressive" blade position.

Thus the object of the invention is to create a simple and reliable cutting apparatus which automatically ensures individual and variable cutting guidance. The object further consists of proposing a method with which final separation of the fish fillets from the backbone is implemented with maximum yield without risk of incisions into the backbone.

SUMMARY OF THE INVENTION

This object is achieved by a cutting apparatus of the type referred to hereinbefore in that, for the purpose of altering the distance between the circular blades, the knife heads are mounted in a movable manner on the frame structure and in that the cutting blade assembly is assigned at least one sensing element, which is fixed to one of the movable knife heads, each sensing element being arranged on the knife head downstream of the cutting edges of the circular blades, viewed in transport direction T, said cutting edges being directed counter to the transport direction T, and protrudes beyond the respective cutting edge, viewed in a direction transverse to the transport direction T, towards the central axis of the transport apparatus and thus of the fish to be processed. The knife heads are mounted so as to be movable individually or synchronously towards the central axis of the transport apparatus and therefore of the fish to be processed and away from it/them, i.e. transverse to the transport direction T. The cutting blade assembly or the knife heads of the cutting blade assembly are preferably mounted to be substantially free to oscillate. This means that the knife heads can freely, even if only against the resistance of a spring force or the like, move out of the way of the fish to be processed or parts thereof.

The at least one sensing element creates a mechanical coupling between sensing element and knife head for controlling the knife heads, by means of which the distance between the circular blades and the backbone can be individually controlled. As the circular blades first strike the fish, which are transported tail-first and back pointing upwards, with their cutting edges directed in the opposite direction to transport direction T, fish fillets are cut on the dorsal side and the backbone is at least partially exposed. The sensing element located downstream, in transport direction T, of the circular blades or at least of the cutting edges directed in the opposite direction to the transport direction T, enters this cut and runs along the backbone on the outside. The fact that the sensing element is guided along a hard bone material enables precise sensing and correspondingly also precise control in that, for example, size and/or outline-related changes of the backbone immediately cause the circular blades to move out of the way.

As the sensing element is closer to the central axis of the transport apparatus and thus closer to the backbone of the fish than the circular blades, any deviation/change in outline of the backbone, i.e. due to different fish sizes, backbone increasing in size from the tail towards the head and/or abnormalities in the region of the backbone, is detected by the sensing element and transferred directly to the circular blades in that the sensing elements moving out of the way inevitably results in the knife heads and thus the circular blades moving out of the way. As a result, on the one hand, the circular blades are set individually for each fish as close as possible to the backbone in order to generate maximum yield and, on the other hand, the sensing element prevents the circular blades from penetrating into the backbone. In simple terms, each sensing element scans the respective width/outline of the backbone in transport direction T downstream of the circular blades but close to them such that deflections of each sensing element initiated by the backbone lead immediately and directly to deflection of the knife heads with the circular blades. Each sensing element thus prevents the distance between the circular blades from being too small which effectively prevents cutting into the backbone with the resulting consequences of wear, jamming or bone residues in the fish fillet.

A preferred embodiment is characterised in that the two knife heads are configured to be controllable separately from each other, each knife head being assigned its own sensing element, the two sensing elements being located at a distance from each other on opposite sides of the transport path. As mentioned, both knife heads can be controlled with a single sensing element, e.g. via corresponding control and/or synchronisation mimic circuits. However, individual control of each knife head by itself is preferred. Due to the fact that each side of the backbone can be scanned individually by a separate sensing element, it is possible in particular to control only one of the circular blades away from the narrowest path along the backbone, if, for example, there is a deformation on one side of the backbone, while the second circular blade on the opposite side can continue to be guided along the narrowest path as a result of which a further increase in yield is implemented.

Expediently, the distance between the sensing elements transverse to the transport direction T is smaller than the distance between the cutting edges of the circular blades transverse to the transport direction T. In other words, the two opposing sensing elements form a narrower passage channel for the fish to be processed than the two opposing circular blades. This reliably ensures that any change in outline of the backbone which results in a deflection of the sensing element is transferred to the circular blades in a timely manner. The sensing elements detect any obstacle on the backbone along the transport path before the circular blades have reached this obstacle and ensure, via the mechanical coupling with the knife heads, that the circular blades are still steered so far away in good time that a collision of the circular blades with the backbone or parts thereof is ruled out.

Advantageously, the two knife heads are each arranged on a free end of a supporting arm, the supporting arms having a common pivot axis S above the transport apparatus, which pivot axis extends in transport direction T and is located on or above the central axis of the transport apparatus and thus of the fish to be processed. On the one hand, the pivot axis S and its orientation ensure that the knife heads substantially swing freely about the pivot axis S. On the other hand, a symmetrical arrangement of the knife heads with respect to the fish to be processed is created, whereby easy and precise control of the knife heads, i.e. direct and precise evasion of the knife heads, initiated by each sensing element, can be implemented.

A preferred development is characterised in that the two knife heads are individually mounted with their supporting arms on the frame structure so as to be pivotable about the pivot axis S, the two supporting arms and thus the knife heads being prestressed with a spring element against an abutment towards the central axis of the transport apparatus and thus of the fish to be processed, in such a manner that the circular blades are spaced apart from each other by a predetermined minimum distance in a starting position. The spring force ensures a defined pressure of the circular blades towards the backbone of the fish. The spring force can be applied, for example, via a pneumatic cylinder. Preferred, however, is a simple spiral spring, for example, which is tensioned between the two supporting arms in such a manner that the spiral spring pulls the two supporting arms towards each other. Optionally, magnetic means can also be used for applying force. On the one hand, the abutment for each supporting arm prevents the two circular blades from colliding with each other and, on the other hand, it defines a predetermined, fixed minimum distance between the two circular blades.

Advantageously, the abutments for the supporting arms are configured to be adjustable so as to be able to adjust the minimum distance between the circular blades. For example, a simple screw or the like can serve as the abutment. By turning the screw against which the supporting arms or also the knife heads abut, the distance between the knife heads and the circular blades can be increased or decreased in a simple manner. Other actuating elements for pre-setting the distance between the circular blades can also be used.

Preferably, each sensing element is configured to be adjustable so as to be able to adjust the distance from the central axis of the transport apparatus and thus of the fish to be processed and their backbone. For this purpose, each sensing element is preferably releasably attached to the knife head. A particularly simple solution provides for sensing elements which are adjustable by loosening a screw, adjusting the distance and tightening the screw. Other actuating elements for pre-setting the distance between the sensing elements and the central axis of the transport apparatus and thus of the fish to be processed and their backbone can also be used.

Advantageously, the distance between the cutting edges of the circular blades, which are directed counter to the transport direction T, on the one hand, and each sensing element in transport direction T, on the other hand, is between 5 and 50 mm, and preferably between 10 and 30 mm. As already explained, viewed in transport direction T, each sensing element is arranged close behind the cutting edges of the circular blades, which are directed counter to the transport direction T, with which the fish to be processed first comes into contact. It is known from empirical investigations that the backbone basically has no abrupt changes in dimensions but rather changes substantially continuously and in particular becomes wider starting from the tail end towards the head end. As each sensing element is arranged immediately downstream of the cutting edges of the circular blades in transport direction T, the evasion/deflection movement of the sensing elements and thus of the knife heads with the circular blades is still sufficient to increase the distance between the circular blades sufficiently far.

An advantageous development is characterised in that each knife head is assigned a deflector element which has a first deflector section which is arranged on the inner side of the circular blades directed towards the central axis M of the transport apparatus and thus of the fish to be processed, and has a second deflector section which extends, in a manner bending away from the first deflector section, away from the central axis M of the transport apparatus and thus of the fish to be processed. The deflector element ensures that the fish fillet cut by the circular blades is not cut again. In other words, the deflector element protects the already cut regions of the fish fillet from renewed contact with the cutting edges of the circular blades.

Each sensing element is preferably configured integrally with the deflector element. This ensures a particularly simple construction as multiple functions are achieved with one component. For example, the deflector element can include a finger-like sensing element in extension of the deflector section which extends into the transport path of the fish to be processed. However, other variants in the configuration of the sensing element, e.g. in the form of separate sensing means, can also be used.

A preferred embodiment is characterised in that the knife heads and/or the circular blades are configured, on the one hand, to be pivotable and/or adjustable about axes extending in transport direction T and, on the other hand, to be pivotable and/or adjustable about axes aligned vertical to the transport plane. This ensures, in a particularly simple and precise manner, optimum pre-setting of the circular blades for a yield-optimised cut.

The object is also achieved by a method with the steps referred to hereinbefore in that the circular blades are controlled with respect to their distance from each other by at least one sensing element which is guided in transport direction T downstream of the cutting edges of the circular blades, directed counter to the transport direction T, laterally along the backbone of the fish which is exposed by the cutting.

The advantages arising from this have already been explained in connection with the cutting apparatus, which is why reference will be made to the relevant passages to avoid repetitions. Finally, the sensing elements identify any deviation of the backbone and ensure that the circular blades move out of the way before they reach the deviations identified.

Preferably, the circular blades, depending on the movement of the sensing elements, are moved individually, transverse to the transport direction T, away from the backbone and towards the backbone by a mechanical coupling between sensing element and the knife heads comprising the circular blades.

According to the invention, the width of the backbone is scanned by each sensing element in a section of the backbone which has already passed the circular blades.

Particularly preferably, the method is carried out using a cutting apparatus as disclosed herein.

The advantages arising from the preceding method steps have already been described in connection with the cutting apparatus, which is why reference will be made to the relevant passages to avoid repetitions.

BRIEF DESCRIPTION OF THE DRAWINGS

Further expedient and/or advantageous features and developments of the cutting apparatus and the method emerge from the description. Especially preferred embodiments of the cutting apparatus and the method are explained in greater detail with reference to the attached drawing. The drawing shows:

FIG. 5 *a* to *c* is a schematic representation of the cutting apparatus in different processing states.

DETAILED DESCRIPTION OF THE INVENTION

The cutting apparatus shown in the drawing is configured and adapted for the final separation of fish fillets from fish which are transported, tail-first, in transport direction T along a transport path and which have already undergone a belly cut and a flank cut.

The cutting apparatus 10 shown comprises a frame structure 11, a transport apparatus 13, which is rotatively driven by means of a drive element 12, having at least one receiving element 14 for a fish to be processed, and a cutting blade assembly 15 which has two knife heads 16, 17 each with a driven circular blade 18, 19, the two knife heads 16, 17 being located on opposite sides of the transport path in such a manner that the fish which are to be processed can be transported along the transport path between the circular blades 18, 19 located at a distance from each other.

This cutting apparatus 10 is characterised according to the invention in that, for the purpose of altering the distance between the circular blades 18, 19, the knife heads 16, 17 are mounted in a movable manner on the frame structure 11, and in that the cutting blade assembly 15 is assigned at least one sensing element 20, which is fixed to one of the movable knife heads 16, 17, each sensing element 20 being arranged on the knife head 16, 17 downstream of the cutting edges $S_K$ of the circular blades 18, 19, viewed in transport direction T, said cutting edges being directed counter to the transport direction T, and protrudes beyond the respective cutting edge $S_K$, viewed in a direction transverse to the transport direction T, towards the central axis M of the transport apparatus 13 and thus of the fish to be processed.

The cutting apparatus 10 can be configured as an isolated processing station. Preferably, further processing stations, such as a cutting blade assembly for the belly cut, a cutting blade assembly for the flank cut and a cutting blade assembly for pin bone cutting, are arranged along the transport path in transport direction T upstream of the cutting apparatus 10 or upstream of the cutting blade assembly 15 for the dorsal/separating cut to form a processing line. The cutting apparatus 10 according to the invention can comprise an independent control and/or regulating device. Preferably, the processing line comprises a higher-level control and/or regulating device to which the individual processing stations are connected.

When taken on their own or in combination with each other, the features and developments described below illustrate preferred embodiments. It is expressly pointed out that features which are summarised in the description and/or the drawing or are described in a common embodiment can also further develop the cutting apparatus 10 described above in a functionally independent manner.

The cutting apparatus 10 is preferably configured and adapted such that the fish to be processed are transported not only tail-first in transport direction T but additionally with the back pointing upwards. The transport apparatus 13 is oriented in such a manner that a substantially horizontal transport plane E emerges, although transport planes inclined with respect to the horizontal are also possible. The cutting blade assembly 15 is preferably arranged above the transport apparatus 13. The transport apparatus 13, for example, has a transport chain or a transport belt. In the embodiment shown, the transport apparatus 13 is a spike strip 21 which is rotatively guided and or driven around deflection and/or drive bodies 22. The spike strip 21, an endless conveyor belt 23 with spike-like attachments 24 as receiving elements 14 for the fish to be transported, comprises a transport run 25 and a return run 26. The cutting blade assembly 15 is arranged above the transport run 25.

The fish to be processed strike the cutting blade assembly 15 tail-first. The tail threads between the circular blades 18, 19 which are spaced apart from each other. Then the circular blades 18, 19, strike the fish with their cutting edges $S_K$, directed counter to the transport direction T. By transporting the fish in transport direction T, the circular blades 18, 19 cut on both sides along the backbone of the fish and separate the fish fillets completely from the bone structure.

The knife heads 16, 17 can be synchronously controlled via a corresponding mimic circuit/design. Preferably, however, the two knife heads 16, 17 are configured to be controllable separately from each other, each knife head 16, 17 being assigned its own sensing element 20, 27, the two sensing elements 20, 27 being located at a distance from each other on opposing sides of the transport path. The control of the knife heads 16, 17 describes the movability of the knife heads 16, 17 and thus positioning of the circular blades 18, 19 with respect to the fish to be processed. Due to the configuration as a separately controllable knife head 16, 17, each knife head 16, 17 can be moved and adjusted individually. Each knife head 16, 17 has its own sensing element 20, 27, such that during processing each knife head 16, 17 can be individually positioned in an optimised manner with respect to the fish to be processed due to the mechanical coupling with its own sensing element 20, 27 depending, for example, on the curve and/or the outline and/or the dimension of the backbone.

Figures 5A, 5B:
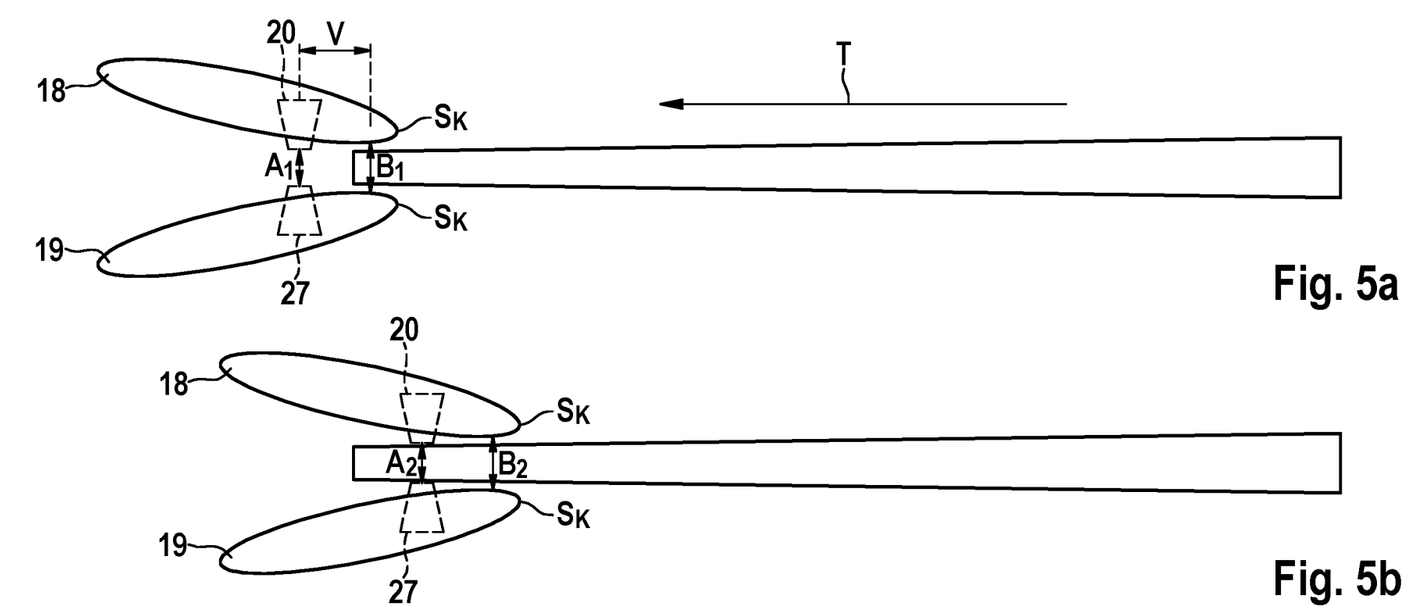
Figure 5C:
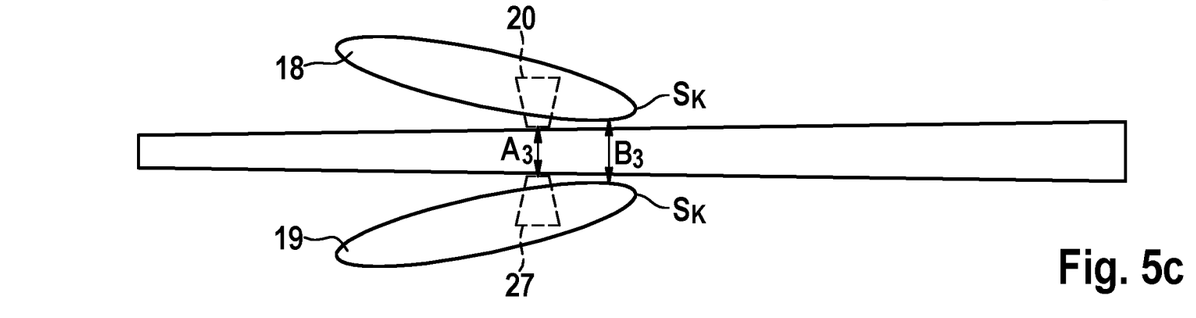

The distance A between the sensing elements 20, 27 transverse to the transport direction T is smaller than the distance B of the cutting edges $S_K$ between the circular blades 18, 19 transverse to the transport direction T. This means that in any processing situation the sensing elements 20, 27 are closer to the central axis M of the transport apparatus 13 and thus to the fish to be processed and its backbone than the circular blades 18, 19 with their cutting edges $S_K$ in the region of their smallest distance $B_1$. FIGS. 5a to c describe various processing situations of the cutting apparatus 10. In FIG. 5a, the fish to be processed is threaded straight with its tail end between the circular blades 18, 19. The circular blades 18, 19 or their cutting edges $S_K$ have a pre-set minimum distance $B_1$. The sensing elements 20, 27 have a distance $A_1$, wherein $A_1<B_1$. As transport progresses, the fish reaches the sensing elements 20, 27 with its backbone exposed by the circular blades 18, 19. The backbone usually has an increasing width starting from the tail end towards the head end. In FIG. 5b, the backbone has just reached the sensing elements 20, 27, however, the width of the backbone in this region still corresponds to the distance $A_2$ of the sensing elements, wherein $A_2=A_1$, so that no deflection occurs as yet. Accordingly, the distance $B_2$ of the cutting edges $S_K$ of the circular blades 18, 19 is unchanged, namely $B_2=B_1$. In FIG. 5c, the backbone is located between the sensing elements 20, 27 with a width that is greater than $A_1=A_2$. Accordingly, the sensing elements 20, 27 are deflected laterally. As a result, the sensing elements 20, 27 have a distance $A_3$, wherein $A_3>A_1=A_2$. Due to the mechanical coupling of sensing elements 20, 27 and knife head 16, 17, the distance $B_3$ of the cutting edges $S_K$ of the circular blades 18, 19 is greater than $B_1=B_2$. With a uniformly shaped backbone, the knife heads 16, 17 move synchronously. In the event that the backbone, for example, has a deformation on one side, the distance $B_3$ and thus $A_3$ will only be changed by the movement of a single knife head 16 or 17.

Figure 1:
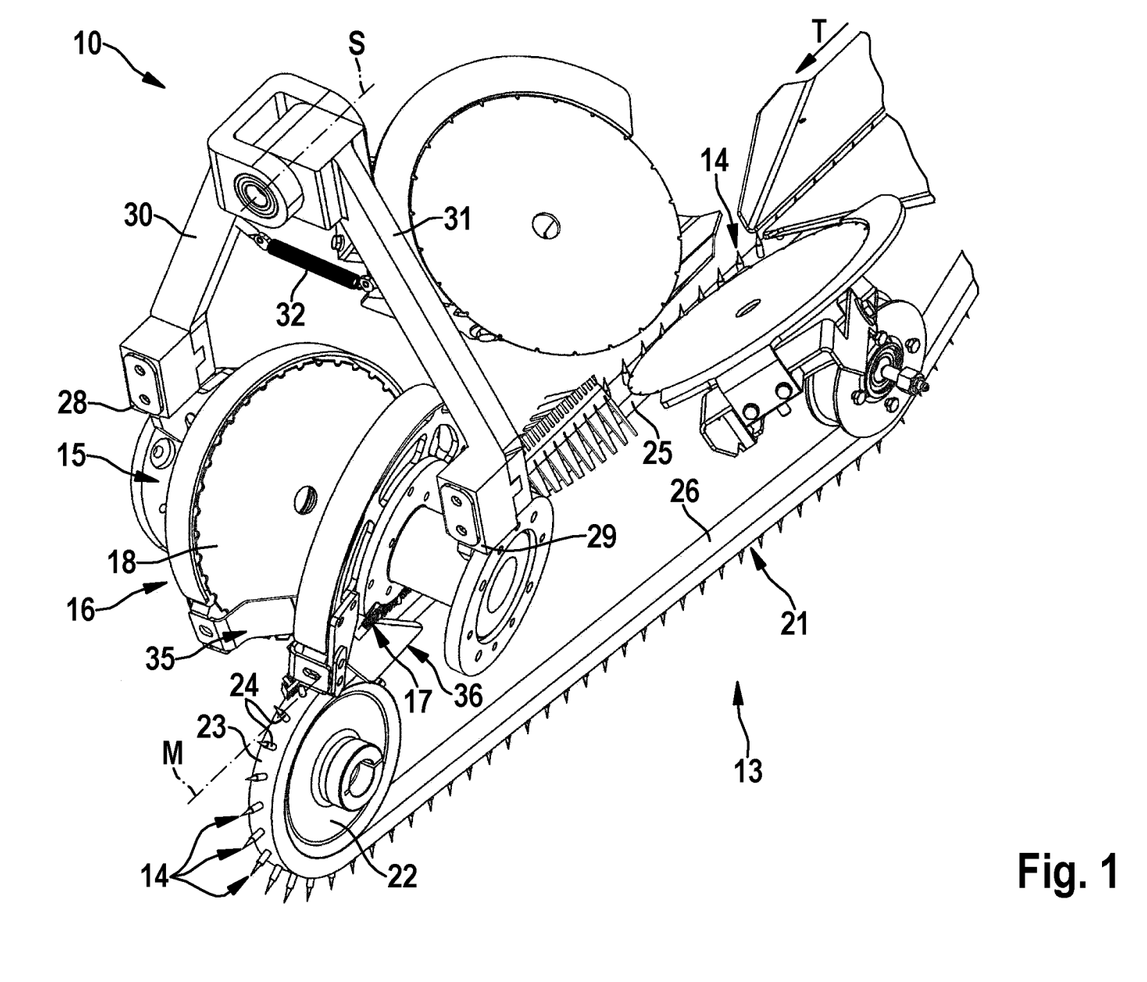
FIG. 1 is a schematic representation of relevant components of a cutting apparatus according to the invention in a perspective view.
Figure 2:
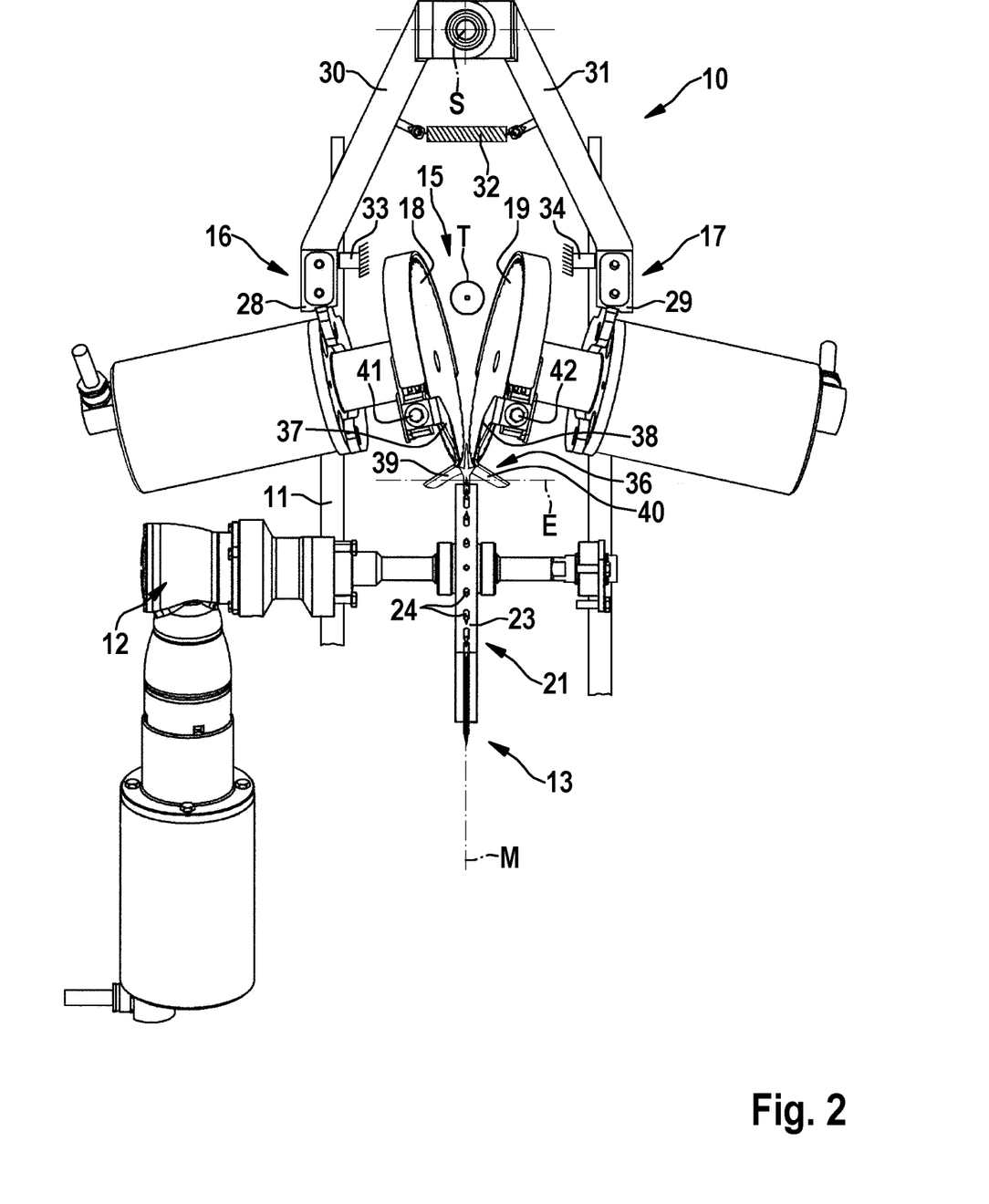
FIG. 2 is a front view of the cutting apparatus counter to the transport direction T.
Figure 3:
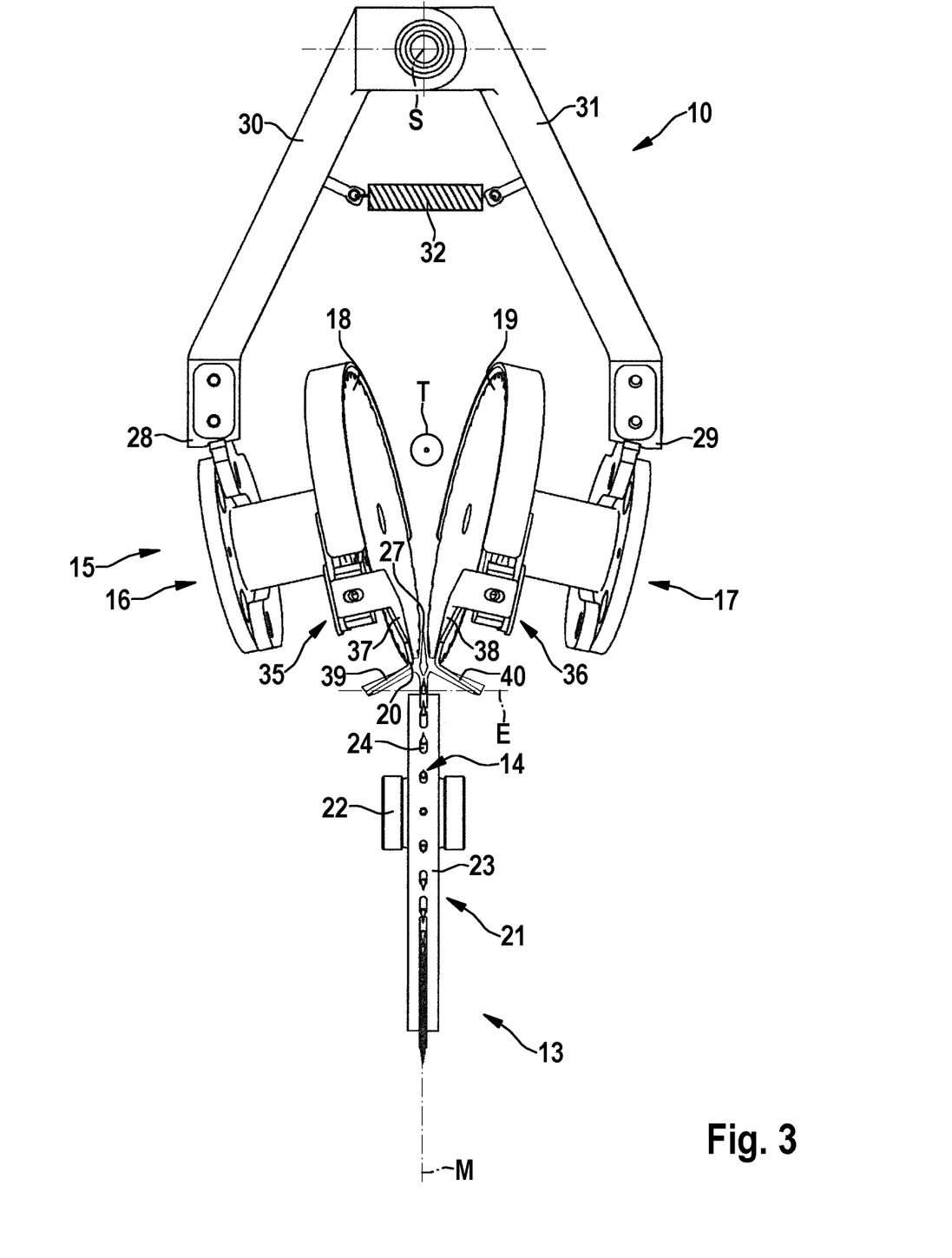
FIG. 3 is a view from above of the cutting blade assembly.
Figure 4:
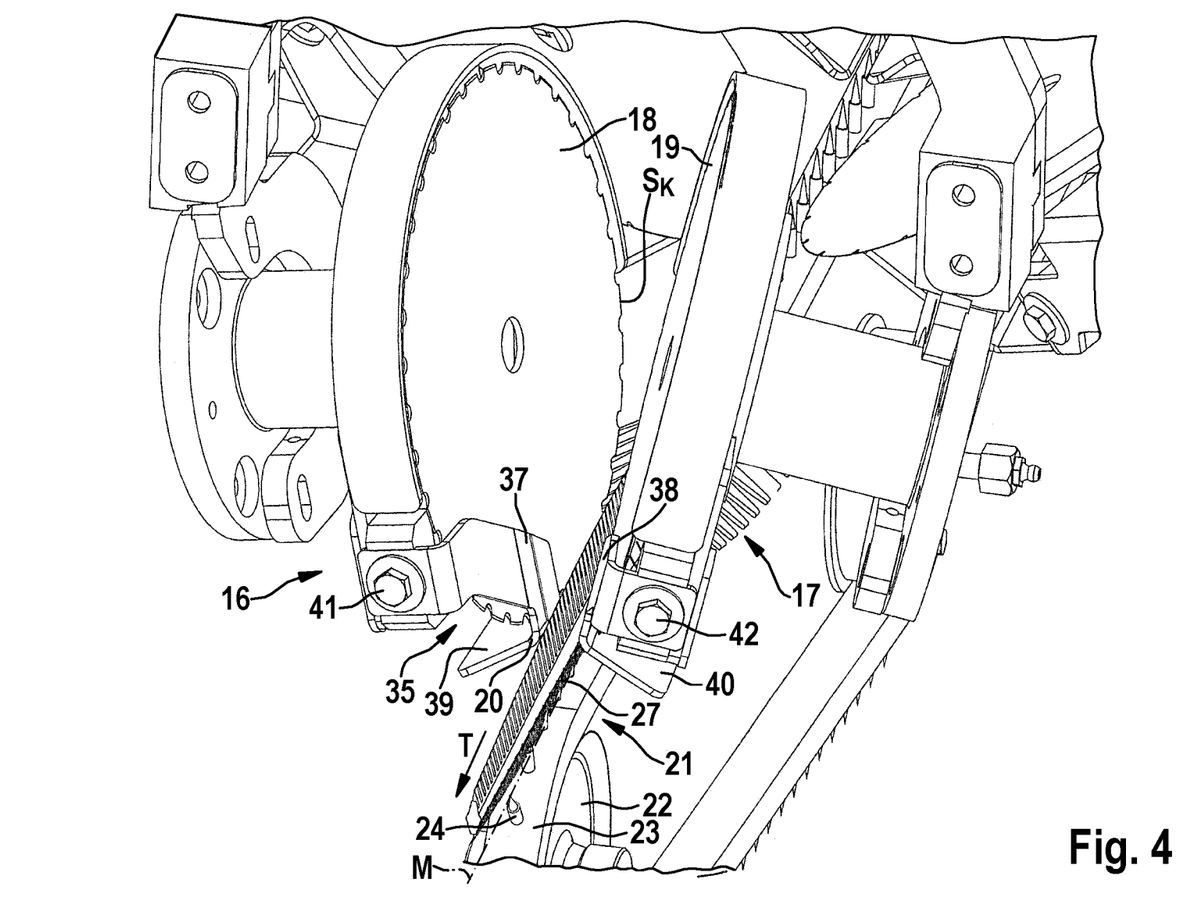
FIG. 4 is a schematic representation of a knife head with deflector element and sensing element in a perspective view.

The knife heads 16, 17 can be mounted on the frame structure 11 so as to be directly movable. Preferably, the two knife heads 16, 17 are each arranged on a free end 28, 29 of a supporting arm 30, 31, the supporting arms 30, 31 having a common pivot axis S above the transport apparatus 13, which pivot axis extends in transport direction T and is located on or above the central axis of the transport apparatus 13 and thus of the fish to be processed (see in particular FIG. 2). Optionally, the supporting arms 30, 31 can be mounted in a substantially free-swinging manner in such a way that the knife heads 16, 17, due among other things to the cantilever-like shape of the supporting arms 30, 31, are configured and adapted to pivot about the pivot axis S towards the central axis M. Preferably, the two knife heads 16, 17 are individually mounted with their supporting arms 30, 31 on the frame structure 11 so as to be pivotable about the pivot axis S, the two supporting arms 30, 31 and thus the knife heads 16, 17 being prestressed with a spring element 32 towards each other and against an abutment 33, 34 towards the central axis M of the transport apparatus 13 and thus of the fish to be processed, in such a manner that the circular blades 18, 19 are spaced apart from each other by a predetermined minimum distance $B_1$ in a starting position (see FIG. 5a). Separate spring elements 32 can be provided for each supporting arm 30, 31. Pneumatic cylinders or the like are also considered as spring elements 32. The spring force is adjustable, particularly when using pneumatic cylinders. Particularly preferably, a spring element 32 spanning the transport path is provided between the two supporting arms 30, 31 transverse to the transport direction T.

The abutments 33, 34 can be fixed abutment bolts or the like. Preferably, however, the abutments 33, 34 for the supporting arms 30, 31 are configured to be adjustable so as to be able to adjust the distance B, and in particular the minimum distance $B_1$ between the circular blades 18, 19. As described, the abutments 33, 34 can be of a mechanical nature. In other embodiments, the movement of the knife heads 16, 17 can also be electromechanically or electronically restricted or limited.

Preferably, each sensing element 20, 27 is also configured to be adjustable so as to be able to adjust the distance A from the central axis M of the transport apparatus 13 and thus of the fish to be processed and their backbone. In simple embodiments, the sensing elements 20, 27 are set to a fixed minimum distance $A_1$. Due to the adjustable configuration, the minimum distance $A_1$ can be individually pre-set.

As described above, the sensing elements 20, 27, viewed in transport direction T, are located close behind the cutting edges $S_K$ of the circular blades 18, 19. Close, for example, depends on the shape and/or outline and/or width of the backbone and generally means that the distance is only so great that detecting/sensing possible thickenings inevitably leads to the circular blades still being moved outwards in time to prevent cutting into the backbone. Specifically, the distance V between the cutting edges $S_K$ of the circular blades 18, 19, which are directed counter to the transport direction T, on the one hand, and each sensing element 20, 27 in transport direction T, on the other hand, is between 5 and 50 mm, and preferably between 10 and 30 mm.

Optionally, each knife head 16, 17 is assigned a deflector element 35, 36 which has a first deflector section 37, 38 which is arranged on the inner side of the circular blades 18, 19 directed towards the central axis M of the transport apparatus 13 and thus of the fish to be processed, and has a second deflector section 39, 40 which extends, in a manner bending away from the first deflector section 37, 38, away from the central axis M of the transport apparatus 13 and thus of the fish to be processed. Each sensing element 20, 27 is preferably configured integrally with the deflector element 35, 36. In the embodiments shown, the sensing element 20, 27 is a partial extension of the second deflector section 39, 40. The deflector element 35, 36 comprising the sensing element 20, 27 is releasably attached to the knife head 16, 17, for example, by means of screws 41, 42.

The position or inclination of the circular blades 18, 19 is adjustable. This can be implemented via the adjustability of the knife heads 16, 17 or of the circular blades 18, 19 themselves. For adjustment/displacement, the knife heads 16, 17 and/or the circular blades 18, 19 are configured, on the one hand, to be pivotable and/or adjustable about axes extending in transport direction T and, on the other hand, to be pivotable and/or adjustable about axes aligned vertical to the transport plane E.

The method according to the invention is described below based in particular on the drawings 5a to c:

The method is used for the final separation of fish fillets from fish which are transported, tail-first, in transport direction T along a transport path and which have already undergone a belly cut and a flank cut. For this purpose, the fish to be processed are transported tail-first in transport direction T along a transport path by means of a transport apparatus 13. The belly side with the dorsal spokes is directed downwards. The dorsal side with the ventral spokes points upwards. During transport along the transport path, the fish fillets are cut parallel to the backbone of the fish to be processed by means of a cutting blade assembly 15, in that the fish to be processed are transported through, tail-first and with their backs directed upwards towards the cutting blade assembly 15, between two circular blades 18, 19 of the cutting blade assembly 15 which are located at a distance from each other.

This method is characterised according to the invention in that the circular blades 18, 19 are controlled with respect to their distance from each other by at least one sensing element 20, 27 which is guided in transport direction T behind the cutting edges $S_K$ of the circular blades 18, 19, directed counter to the transport direction T, laterally along the backbone of the fish which is exposed by the cutting. The circular blades 18, 19 can be adjusted to the optimum position in each case during the cutting process, as each sensing element virtually feels existing changes in the size/width/outline of the backbone and transmits the corresponding evasive movements to the circular blades. Due to the fact that the original/smallest distance A of two opposing sensing elements 20, 27 is smaller than the original/smallest distance B of the circular blades 18, 19 opposing each other, scanning of the backbone in transport direction T downstream of the cutting edges $S_K$ of the circular blades 18, 19 still results in a timely increase in the distance between the circular blades 18, 19. The width of the backbone is preferably scanned by each sensing element 20, 27 in a section of the backbone which has already passed the circular blades 18, 19.

Preferably, the circular blades 18, 19, depending on the movement of the sensing elements 20, 27, are moved individually, transverse to the transport direction T, away from the backbone and towards the backbone by a mechanical coupling between sensing element 20, 27 and the knife heads 16, 17 comprising the circular blades 18, 19. Each circular blade 18, 19 thereby follows an individual path along the backbone depending on the position of the sensing element 20, 27 assigned in each case. As soon as the fish with its backbone has left the region of the circular blades 18, 19, the sensing elements 20, 27 and thus also the knife heads 16, 17 move back to their original starting position.

Particularly preferably, the method is carried out using a cutting apparatus as disclosed herein.

The invention claimed is:

1. A cutting apparatus, configured and adapted for the final separation of fish fillets from fish which are transported, tail-first, in a transport direction along a transport path and which have already undergone a belly cut and a flank cut, comprising:
    a frame structure;
    a transport apparatus which is rotatively driven by means of a drive element, the transport apparatus having at least one receiving element for a fish to be processed; and
    a cutting blade assembly having two knife heads each with a driven circular blade, the two knife heads being located on opposite sides of the transport path in such a manner that the fish which are to be processed are transported along the transport path between the spaced apart circular blades;
    the knife heads being mounted in a movable manner on the frame structure for the purpose of altering a distance between the circular blades;
    at least one sensing element fixed to one of the movable knife heads, each of the at least one sensing element being arranged on the one of the knife heads downstream of the cutting edges of the circular blades, as viewed in the transport direction, the cutting edges being directed counter to the transport direction, the at least one sensing element protruding beyond the respective cutting edge, as viewed in a direction transverse to the transport direction, towards a central axis of the transport apparatus and thus of the fish to be processed.

2. The cutting apparatus according to claim 1, wherein the two knife heads are configured to be controllable separately from each other, the at least one sensing element comprising a sensing element for each knife head, wherein the sensing elements are located at a distance from each other on opposing sides of the transport path.

3. The cutting apparatus according to claim 2, wherein the distance of the sensing elements from each other in the direction transverse to the transport direction is smaller than a distance of the cutting edges of the circular blades from each other in the direction transverse to the transport direction.

4. The cutting apparatus according to claim 1, wherein the two knife heads are each arranged on a free end of a supporting arm, the supporting arms having a common pivot axis above the transport apparatus, pivot axis extending in the transport direction and located on or above the central axis of the transport apparatus and thus of the fish to be processed.

5. The cutting apparatus according to claim 4, wherein the two knife heads are individually mounted with their supporting arms on the frame structure so as to be pivotable about the pivot axis, the two supporting arms and thus the knife heads being prestressed with a spring element against an abutment towards the central axis of the transport apparatus and thus of the fish to be processed, such that the circular blades are spaced apart from each other by a predetermined minimum distance in a starting position.

6. The cutting apparatus according to claim 5, wherein the abutments for the supporting arms are configured to be adjustable so as to be able to adjust the minimum distance between the circular blades.

7. The cutting apparatus according to claim 1, wherein each of the at least one sensing element is configured to be adjustable so as to be able to adjust a distance from the central axis of the transport apparatus and thus of the fish to be processed and a backbone of the fish.

8. The cutting apparatus according to claim 1, wherein a distance between the cutting edges of the circular blades, which are directed counter to the transport direction, on the one hand, and the at least one sensing element in the transport direction, on the other hand, is between 5 and 50 mm, and preferably between 10 and 30 mm.

9. The cutting apparatus according to claim 1, wherein each knife head is assigned a deflector element which has a first deflector section is arranged on an inner side of the circular blades directed towards the central axis of the transport apparatus and thus of the fish to be processed, each deflector element further having a second deflector section which extends, in a manner bending away from the first deflector section, away from the central axis of the transport apparatus and thus of the fish to be processed.

10. The cutting apparatus according to claim 9, wherein each of the at least one sensing element is configured integrally with the deflector element.

11. The cutting apparatus according to claim 1, wherein the knife heads and/or the circular blades are configured, on the one hand, to be pivotable and/or adjustable about axes extending in the transport direction and, on the other hand, to be pivotable and/or adjustable about axes aligned vertical to a transport plane.

12. A method for a final separation of fish fillets from fish which are transported, tail-first, in a transport direction along a transport path and which have already undergone a belly cut and a flank cut, comprising the steps:
    transporting the fish to be processed tail-first in the transport direction along the transport path by means of a transport apparatus;
    cutting the fish fillets parallel to a backbone of the fish to be processed by means of a cutting blade assembly, in that the fish to be processed are transported through, tail-first and with their backs directed upwards towards the cutting blade assembly, between two circular blades of the cutting blade assembly which are located at a distance from each other;
    wherein the circular blades are controlled with respect to a distance from each other by at least one sensing element which is guided in the transport direction downstream of cutting edges of the circular blades, which are directed counter to the transport direction, laterally along the backbone of the fish which is exposed by the cutting.

13. The method according to claim 12, wherein the circular blades, depending on a movement of the sensing elements, are moved individually, transverse to the transport direction, away from the backbone and towards the backbone by a mechanical coupling between the at least one sensing element and the knife heads comprising the circular blades.

14. The method according to claim 12, wherein a width of the backbone is scanned by each of the at least one sensing element in a section of the backbone which has already passed the circular blades.

15. The method according to claim 12, wherein the method it is carried out with a cutting apparatus comprising:
    a frame structure;
    a transport apparatus which is rotatively driven by means of a drive element, the transport apparatus having at least one receiving element for a fish to be processed; and
    a cutting blade assembly having two knife heads each with a driven circular blade, the two knife heads being located on opposite sides of the transport path in such a manner that the fish which are to be processed are transported along the transport path between the spaced apart circular blades;

the knife heads being mounted in a movable manner on the frame structure for the purpose of altering a distance between the circular blades;

at least one sensing element fixed to one of the movable knife heads, each of the at least one sensing element being arranged on the one of the knife heads downstream of the cutting edges of the circular blades, as viewed in the transport direction, the cutting edges being directed counter to the transport direction, the at least one sensing element protruding beyond the respective cutting edge, as viewed in a direction transverse to the transport direction, towards a central axis of the transport apparatus and thus of the fish to be processed.

\* \* \* \* \*